US012142193B2

(12) United States Patent
Kwon et al.

(10) Patent No.: US 12,142,193 B2
(45) Date of Patent: Nov. 12, 2024

(54) DISPLAY APPARATUS INCLUDING SELF-EMITTING DEVICES

(71) Applicant: LG Display Co., Ltd., Seoul (KR)

(72) Inventors: Yong Chul Kwon, Paju-si (KR); Jong Min Park, Paju-si (KR); Joon Hee Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/959,709

(22) Filed: Oct. 4, 2022

(65) Prior Publication Data

US 2023/0196981 A1 Jun. 22, 2023

(30) Foreign Application Priority Data

Dec. 20, 2021 (KR) ........................ 10-2021-0182746

(51) Int. Cl.
*G09G 3/32* (2016.01)
*G09G 3/3233* (2016.01)
*G09G 3/3266* (2016.01)
*G09G 5/18* (2006.01)

(52) U.S. Cl.
CPC ............ *G09G 3/32* (2013.01); *G09G 3/3233* (2013.01); *G09G 3/3266* (2013.01); *G09G 5/18* (2013.01); *G09G 2300/0819* (2013.01); *G09G 2300/0842* (2013.01); *G09G 2310/0267* (2013.01); *G09G 2310/0275* (2013.01); *G09G 2310/0286* (2013.01); *G09G 2310/08* (2013.01); *G09G 2320/0271* (2013.01); *G09G 2340/0435* (2013.01)

(58) Field of Classification Search
CPC ...... G09G 3/32; G09G 3/3233; G09G 3/3266; G09G 2300/0819; G09G 2300/0842; G09G 2310/0267; G09G 2310/0275; G09G 2310/0286; G09G 2310/08; G09G 5/18; G09G 2320/0271; G09G 2340/0435
USPC ...................................................... 345/76, 55
See application file for complete search history.

(56) References Cited

U.S. PATENT DOCUMENTS

| | | | | | |
|---|---|---|---|---|---|
| 9,697,766 | B2 * | 7/2017 | Kikuchi | ............... | G09G 3/2014 |
| 11,551,606 | B2 * | 1/2023 | Kim | ...................... | G09G 3/3233 |
| 2008/0211746 | A1 * | 9/2008 | Caligiore | ............. | G09G 3/3233 345/76 |
| 2009/0167649 | A1 * | 7/2009 | Ishizuka | .............. | G09G 3/3258 345/80 |
| 2015/0317951 | A1 * | 11/2015 | Genoe | .................. | G09G 3/3283 345/82 |

(Continued)

*Primary Examiner* — Jason M Mandeville
(74) *Attorney, Agent, or Firm* — Fenwick & West LLP

(57) ABSTRACT

A display apparatus includes pixels. Each of the pixels includes a first node controller applying a data voltage to a first node, a second node controller shifting a voltage of a second node from a low level driving voltage to an on pulse voltage, a third node controller applying a reference voltage having an on level to a third node during a first period in one frame and applying the low level driving voltage to the third node during a second period, a driving transistor being on-duty-driven during the first period and off-duty-driven during the second period, and a light emitting device including an anode electrode connected to the second electrode of the driving transistor and a cathode electrode. The light emitting device emits light responsive to a constant current applied from the driving transistor during the first period and does not emit light during the second period.

21 Claims, 13 Drawing Sheets

(56) References Cited

U.S. PATENT DOCUMENTS

| | | | | |
|---|---|---|---|---|
| 2017/0039941 | A1* | 2/2017 | Wu | G09G 3/3258 |
| 2020/0312216 | A1* | 10/2020 | Kim | G09G 3/32 |
| 2022/0199001 | A1* | 6/2022 | Kim | G09G 3/3233 |

* cited by examiner

DISPLAY APPARATUS INCLUDING SELF-EMITTING DEVICES

CROSS-REFERENCE TO RELATED APPLICATIONS

This application claims the benefit of Republic of Korea Patent Application No. 10-2021-0182746 filed on Dec. 20, 2021, which is hereby incorporated by reference in its entirety.

BACKGROUND

Field of Technology

The present disclosure relates to a display apparatus including self-emitting devices.

Discussion of the Related Art

In display apparatuses including self-emitting devices, due to a characteristic of self-emitting devices, it is difficult to express a fine low gray level. In the related art, various methods for increasing a low grayscale resolution have been proposed. However, due to the number of transistors that are provided in a pixel circuit in the related art, process efficiency is low or a micro integrated circuit should be embedded in each pixel circuit, and due to this, it is difficult to apply the methods.

SUMMARY

To overcome the aforementioned problem of the related art, the present disclosure may provide a display panel, which may enhance low grayscale expression in a display apparatus including self-emitting devices, and a display apparatus including the display panel.

To achieve these objects and other advantages and in accordance with the purpose of the disclosure, as embodied and broadly described herein, a display apparatus includes a plurality of pixels. Each of the plurality of pixels includes a first node controller applying a data voltage corresponding to input video data to a first node, a second node controller shifting a voltage of a second node, which is adjacent to the first node, from a low level driving voltage to an on pulse voltage corresponding to a difference between the data voltage and the low level driving voltage, a third node controller applying a reference voltage having an on level to the third node during a first period in one frame, on the basis of a voltage of the second node which is the low level driving voltage, and applying the low level driving voltage to the third node during a second period succeeding the first period in the one frame, on the basis of a voltage of the second node which is the on pulse voltage, a driving transistor including a gate electrode connected to the third node and a first electrode to which a high level driving voltage is applied, the driving transistor being on-duty-driven during the first period and off-duty-driven during the second period on the basis of a voltage of the third node, and a light emitting device including an anode electrode connected to the second electrode of the driving transistor and a cathode electrode to which the low level driving voltage is applied, wherein the light emitting device emits light in response to a constant current applied from the driving transistor during the first period and does not emit light during the second period.

In another aspect of the present disclosure, a display apparatus includes a plurality of pixels. Each of the plurality of pixels includes a first node controller applying a data voltage corresponding to input video data to a first node, a second node controller shifting a voltage of a second node, which is adjacent to the first node, from a high level driving voltage to an off pulse voltage corresponding to a difference between the data voltage and the high level driving voltage, a third node controller applying a low level driving voltage to the third node during a first period in one frame, on the basis of a voltage of the second node which is the high level driving voltage, and applying a reference voltage having an on level to the third node during a second period succeeding the first period in the one frame, on the basis of a voltage of the second node which is the off pulse voltage, a driving transistor including a gate electrode connected to the third node and a first electrode to which the high level driving voltage is applied, the driving transistor being off-duty-driven during the first period and on-duty-driven during the second period on the basis of a voltage of the third node, and a light emitting device including an anode electrode connected to the second electrode of the driving transistor and a cathode electrode to which the low level driving voltage is applied, wherein the light emitting device does not emit light in response to a constant current applied from the driving transistor during the first period and emits light during the second period.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
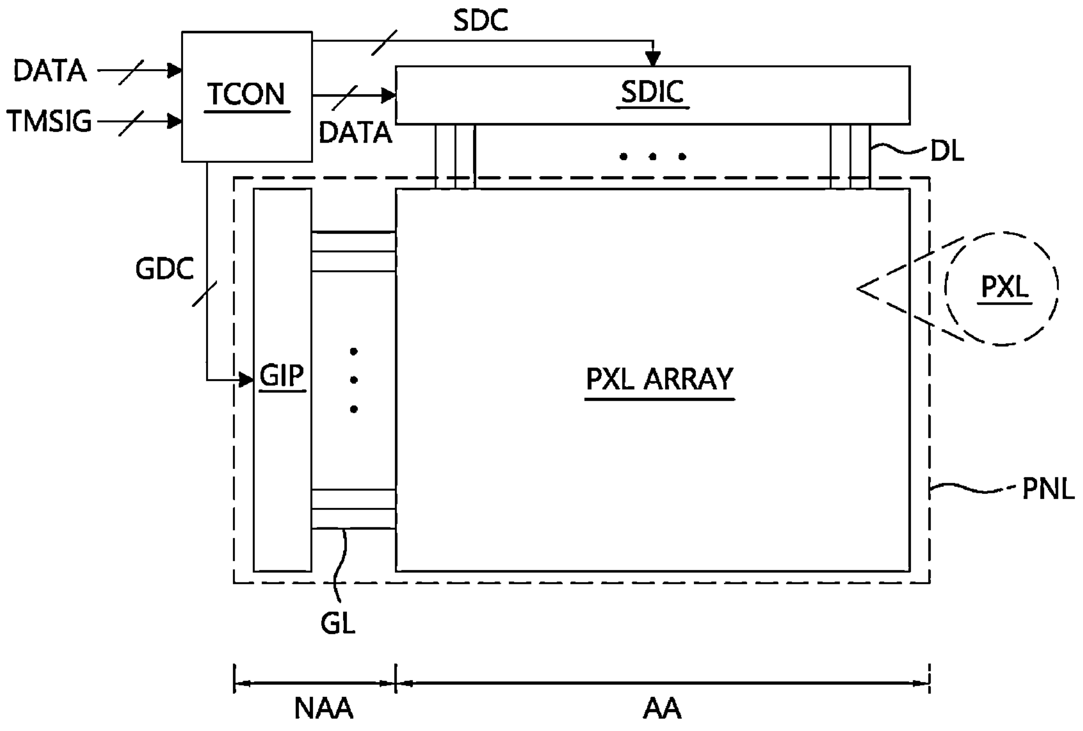
FIG. 1 is a diagram illustrating a display apparatus according to an embodiment of the present disclosure.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A display apparatus according to embodiments of the present disclosure may be a self-emitting display apparatus such as an organic light emitting diode (OLED) display apparatus, a quantum dot display apparatus, or a micro light emitting diode (LED) display apparatus.

When the display apparatus according to embodiments of the present disclosure is an OLED display apparatus, each pixel may include an OLED, self-emitting light, as a self-emitting device. When the display apparatus according to embodiments of the present disclosure is a quantum dot display apparatus, each pixel may include a self-emitting device including a quantum dot which is a semiconductor crystal self-emitting light. When the display apparatus according to embodiments of the present disclosure is a micro LED display apparatus, each pixel may include, as a self-emitting device, a micro LED which self-emits light and includes an inorganic material.

In the following embodiments, a case where a display apparatus includes a self-emitting device based on a micro LED is illustrated, but the technical spirit of the present disclosure is not limited thereto and may be applied all types of self-emitting display apparatuses.

FIG. 1 is a diagram illustrating a display apparatus according to an embodiment of the present disclosure.

Referring to FIG. 1, the display apparatus according to an embodiment of the present disclosure may include a display panel PNL, a timing controller TCON, a data driver SDIC, a gate driver GIP, and a power circuit PMIC.

Data lines DL extending in a column direction (or a vertical direction) and gate lines GL extending in a row direction (or a horizontal direction) may intersect with one another in a display area AA, displaying an input image, of the display panel PNL, and pixels PXL may be arranged in a matrix form to configure a pixel array in each intersection region. Each of the data lines DL may be connected to pixels PXL adjacent thereto in the column direction in common, and each of the gate lines GL may be connected to pixels PXL adjacent thereto in the row direction. Each of the pixels PXL may include a self-emitting device implemented with a micro LED.

The timing controller TCON may receive a timing signal such as a vertical synchronization signal, a horizontal synchronization signal, a data enable signal, and a dot clock from a host system and may generate a source timing control signal SDC for controlling an operation of the data driver SDIC and a gate timing control signal GDC for controlling an operation of the gate driver GIP, on the basis of the timing signal. The timing controller TCON may supply the source timing control signal SDC to the data driver SDIC and may supply the gate timing control signal GDC to the gate driver GIP.

The timing controller TCON may receive video data DATA (or image data) from the host system and may execute a predetermined image quality enhancement algorithm to correct the video data DATA. The timing controller TCON may supply corrected video data DATA to the data driver SDIC through an internal interface circuit.

The data driver SDIC may be connected to the pixels PXL through the data lines DL. The data driver SDIC may generate data voltages for driving of the pixels PXL on the basis of the source timing control signal SDC and may supply the data voltages to the data lines DL. Each of the data voltages corresponds to the video data DATA. The data driver SDIC may divide a predetermined gamma reference voltage to generate gamma compensation voltages and may map the gamma compensation voltages to the video data DATA to generate the data voltages. The data driver SDIC may include a shift register, a latch, a digital-to-analog converter, and an output buffer.

The gate driver GIP may be connected to the pixels PXL through the gate lines GL. The gate driver GIP may generate gate signals on the basis of the gate timing control signal GDC and may supply the gate timing control signal GDC to the gate lines GL on the basis of a supply timing of a data voltage. Pixel columns to which data voltages are to be supplied may be selected by the gate signals.

Two gate lines GL may be connected to each pixel row, and each pixel PXL may be driven by two gate signals. One of two gate signals may have a square waveform which swings between a gate on voltage and a gate off voltage. The other of the two gate signals may have a ramp wave which varies in a diagonal form between the gate on voltage and the gate off voltage.

The gate on voltage may be a gate high voltage VGH which is greater than a threshold voltage of a transistor included in the pixel PXL, and the gate off voltage may be a gate low voltage VGL which is less than the threshold voltage of the transistor. The transistor may be a transistor where a gate electrode thereof is connected to the gate line GL, and the transistor may be turned on in response to the gate signal which is higher than the threshold voltage and may be turned off in response to the gate signal which is lower than the threshold voltage.

The gate driver GIP may be implemented with a gate shift register including a plurality of gate stages. Input/output terminals of the gate stages may be connected to each other in a cascade scheme. The gate stages may be independently connected to the gate lines GL and may output the gate signals to the gate lines GL. The gate shift register may be directly provided as a gate driver in panel type in a bezel area NAA, which does not display an image, of the display panel PNL. The bezel area NAA may be disposed outside the display area AA, but this is not required.

The power circuit PMIC may boost an input direct current (DC) voltage to generate a high level driving voltage VDDEL, a low level driving voltage VSSEL, and a reference voltage Vref needed for driving of the pixels PXL, generate the gate high voltage VGH and the gate low voltage VGL needed for driving of the gate driver GIP, and generate a gamma source voltage needed for driving of the data driver SDIC. Each of the high level driving voltage VDDEL, the reference voltage Vref, and the gate high voltage VGH may be a voltage for turning on a transistor of each pixel PXL. Each of the low level driving voltage VSSEL and the gate low voltage VGL may be a voltage for turning off the transistor of each pixel PXL.

The display apparatus according to the present embodiment may not use a method of expressing a gray level on the basis of a level of a driving current applied to a light emitting device in a state where an emission period is fixed in one frame. The display apparatus according to the present embodiment may control a time length, where a light emitting device is turned on in one frame, on the basis of a data voltage so as to increase the performance of low grayscale expression, and thus, may express a gray level on the basis of an on duty cycle of the light emitting device. To this end, the display apparatus according to the present embodiment may perform a method which controls a time, at which a data voltage matches a ramp waveform of the gate signal in the pixel PXL, based on a level of the data voltage to adjust an on/off timing of a driving transistor, and thus, pulse width modulation (PWM)-drives (i.e., duty-drives) a light emitting device. The following embodiments relate to a driving concept and a pixel configuration for duty-driving a light emitting device.

First Embodiment

Figure 2:
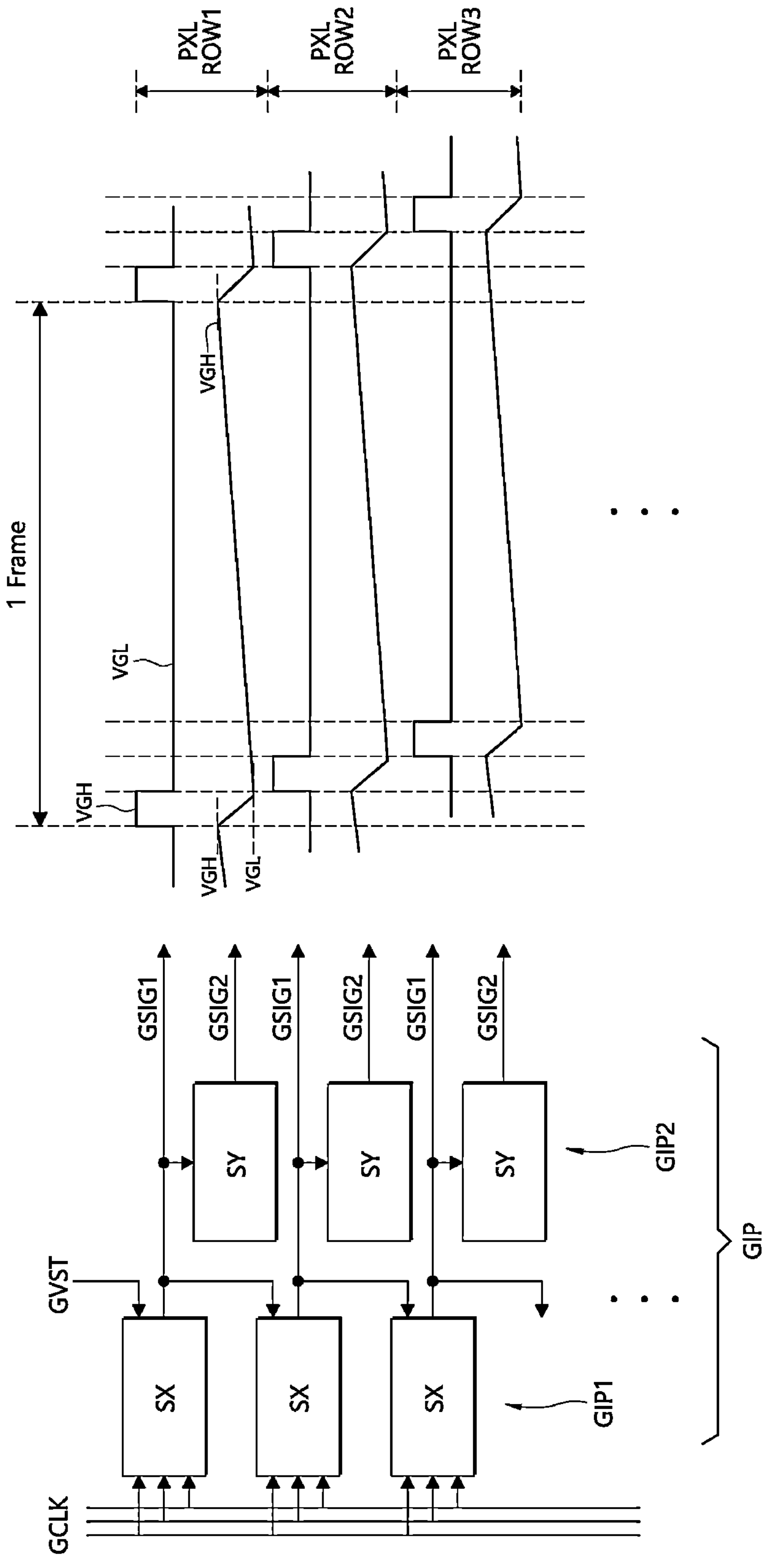
FIG. 2 is a diagram illustrating configurations of first and second gate drivers and gate signals generated by the gate drivers according to a first embodiment.
Figure 3:
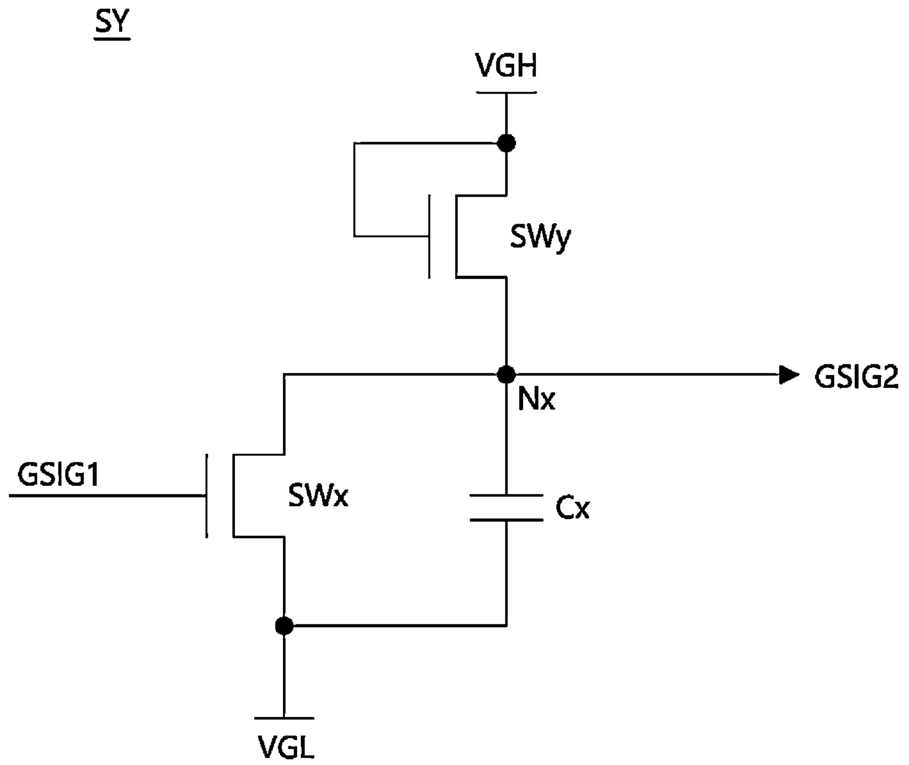
FIG. 3 is a diagram illustrating a configuration of a gate stage of a second gate driver illustrated in FIG. 2 according to the first embodiment.

FIG. 2 is a diagram illustrating configurations of first and second gate drivers and gate signals generated by the gate drivers according to a first embodiment. FIG. 3 is a diagram illustrating a configuration of a gate stage of a second gate driver illustrated in FIG. 2 according to the first embodiment.

Referring to FIG. 2, a gate driver GIP according to the first embodiment may include a first gate driver GIP1 which drives a first gate line included in each pixel row and a second gate driver GIP2 which drives a second gate line included in each pixel row.

The first gate driver GIP1 may include a plurality of first gate stages SX which output a first gate signal GSIG1 having a phase sequentially shifted based on a gate start signal GVST and a gate clock GCLK. The first gate stages SX may be independently connected to the first gate lines of the pixel rows and may output the first gate signal GSIG1, having the sequentially shifted phase, to the first gate lines. The first gate signal GSIG1 may be a square wave which swings between the gate high voltage VGH and the gate low voltage VGL in one frame.

The second gate driver GIP2 may include a plurality of second gate stages SY which output a second gate signal GSIG2 having a phase sequentially shifted based on the first gate signal GSIG1. The second gate stages SY may be independently connected to the second gate lines of the pixel rows and may output the second gate signal GSIG2, having the sequentially shifted phase, to the second gate lines. The second gate signal GSIG2 may be a ramp wave which varies in a diagonal form between the gate high voltage VGH and the gate low voltage VGL in one frame.

One of the second gate stages SY included in the second gate driver GIP2 is illustrated in FIG. 3. The second gate stage SY may include a first switch SWx which turns on or off an electrical connection between an output node Nx and an input terminal for the gate low voltage VGL on the basis of the first gate signal GSIG1, a second switch SWy which is diode-connected (e.g., drain electrode connected to gate electrode) and applies the gate high voltage VGH to the output node Nx, and a storage capacitor Cx which is connected between the output node Nx and the input terminal for the gate low voltage VGL.

While the first gate signal GSIG1 is being input as the gate high voltage VGH, a voltage of the storage capacitor Cx (e.g., a voltage of the output node Nx) may decrease in a diagonal form up to the gate low voltage VGL from the gate high voltage VGH.

On the other hand, while the first gate signal GSIG1 is being input as the gate low voltage VGL, a voltage of the storage capacitor Cx (e.g., a voltage of the output node Nx) may increase in a diagonal form up to the gate high voltage VGH from the gate low voltage VGL.

As a result, the second gate signal GSIG2 output through the output node Nx may decrease in a diagonal form up to the gate low voltage VGL from the gate high voltage VGH in one frame, and then, may increase in a diagonal form up to the gate high voltage VGH from the gate low voltage VGL.

Figure 4:
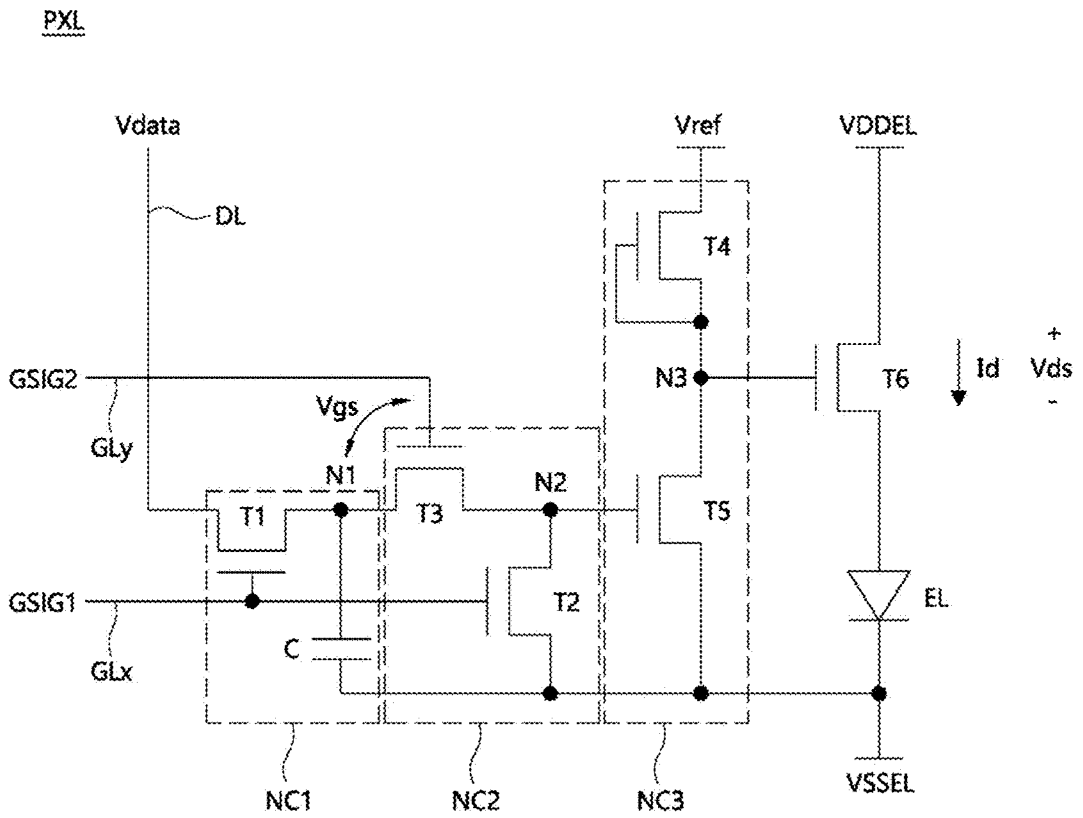
FIG. 4 is a diagram illustrating a configuration of a pixel according to the first embodiment.
Figure 5:
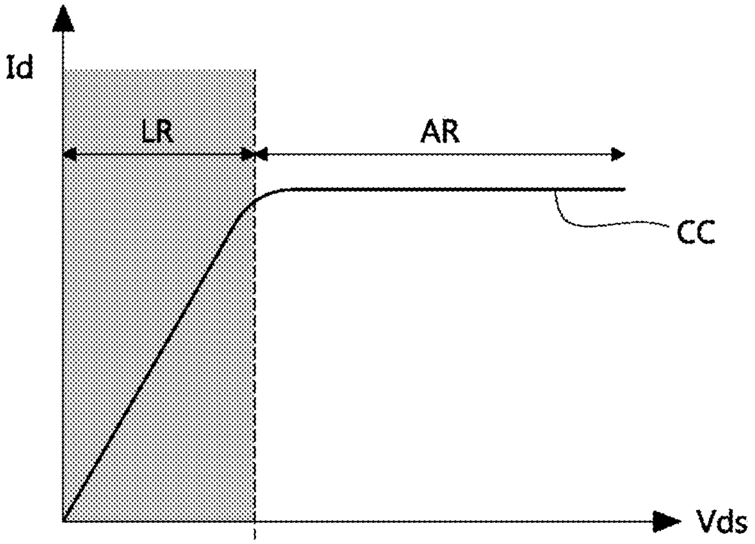
FIG. 5 is a diagram illustrating a characteristic curve of a driving transistor included in the pixel of FIG. 4 according to the first embodiment.
Figure 6:
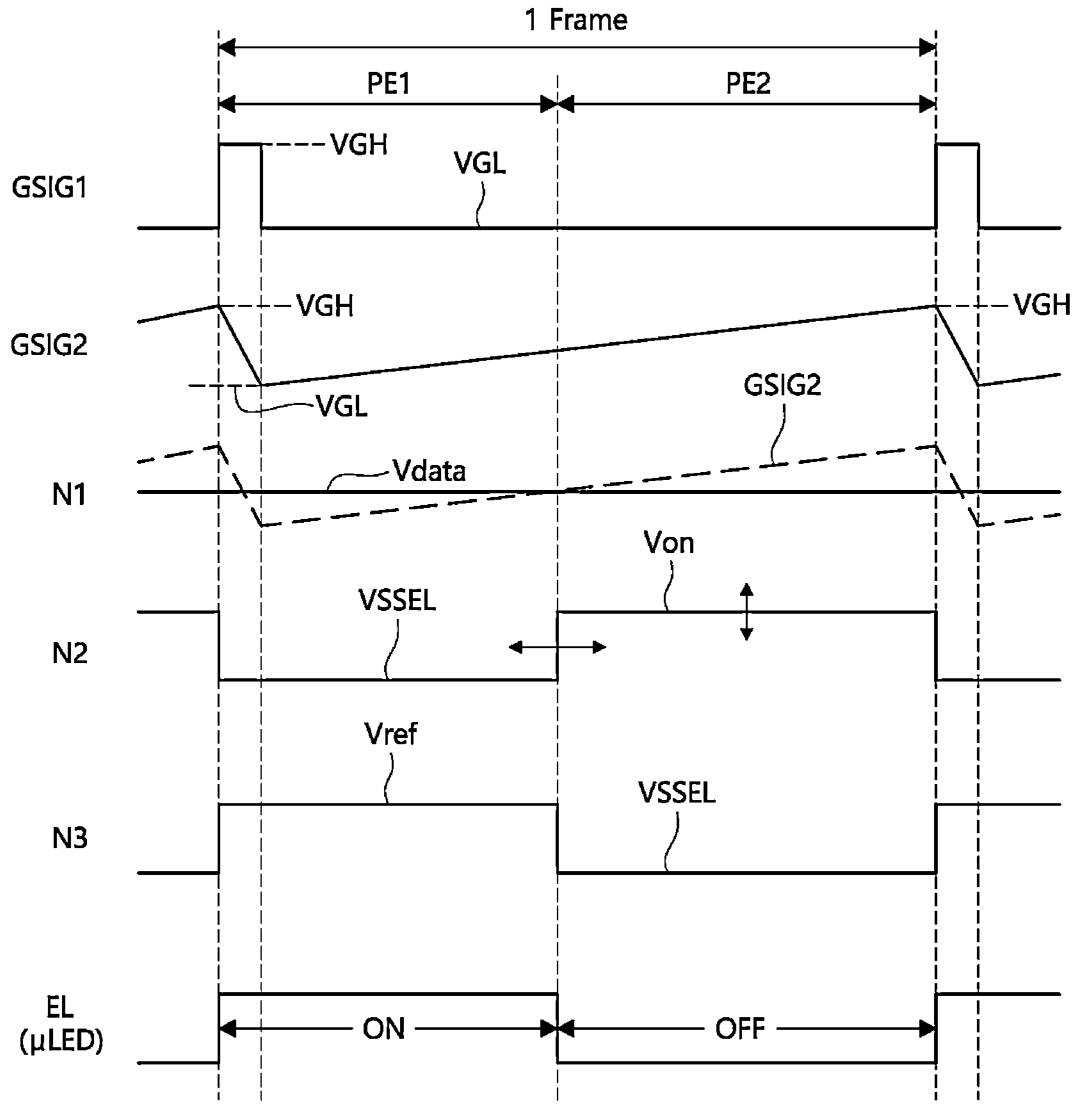
FIGS. 6 and 7 are diagrams illustrating a driving waveform of the pixel of FIG. 4 according to the first embodiment.
Figure 7:
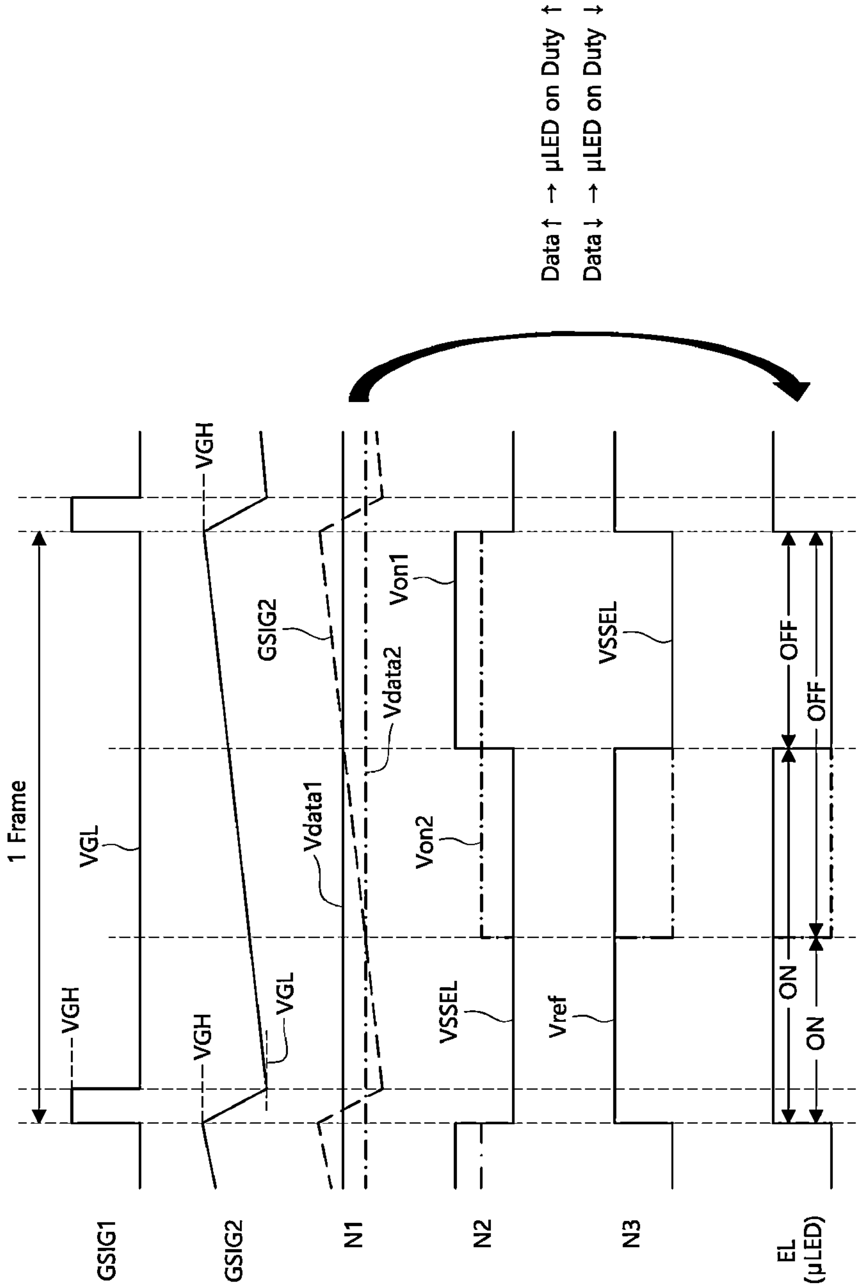

FIG. 4 is a diagram illustrating a configuration of a pixel according to the first embodiment. FIG. 5 is a diagram illustrating a characteristic curve of a driving transistor included in the pixel of FIG. 4 according to the first embodiment. FIGS. 6 and 7 are diagrams illustrating a driving waveform of the pixel of FIG. 4 according to the first embodiment.

Referring to FIGS. 4 to 7, a pixel PXL according to the first embodiment of the present disclosure may include a pixel circuit including a light emitting device EL, first to sixth transistors T1 to T6, and a capacitor C. The first to sixth transistors T1 to T6 may each be implemented as an N-type MOSFET. The sixth transistor T6 may be a driving transistor.

The pixel circuit may include the light emitting device EL, a driving transistor T6, a first node controller NC1, a second node controller NC2, and a third node controller NC3.

The first node controller NC1 may apply a data voltage Vdata, which is for image expression, to the first node N1. The first node controller NC1 may include the first transistor T1 and the capacitor C. The first transistor T1 may apply the data voltage Vdata to the first node N1 during a first period PE1 in one frame, on the basis of the first gate signal GSIG1. A gate electrode of the first transistor T1 may be connected to a first gate line GLx to which the first gate signal GSIG1 is applied, a first electrode of the first transistor T1 may be connected to a data line DL, and a second electrode of the first transistor T1 may be connected to the first node N1. The capacitor C may be connected between the first node N1 and an input terminal for a low level driving voltage VSSEL.

The second node controller NC2 may shift a voltage of the second node N2, which is adjacent to the first node N1, from the low level driving voltage VSSEL to an on pulse voltage Von corresponding to a difference between the data voltage Vdata and the low level driving voltage VSSEL. The second node controller NC2 may control a voltage of the second node N2 to the low level driving voltage VSSEL during the first period PE1 in the one frame and may control a voltage of the second node N2 to the on pulse voltage Von during a second period PE2 succeeding the first period PE1 in the one frame. The second node controller NC2 may include the second transistor T2 and the third transistor T3. The second transistor T2 may apply the low level driving voltage VSSEL to the second node N2 during the first period PE1, on the basis of the first gate signal GSIG1. A gate electrode of the second transistor T2 may be connected to the first gate line GLx to which the first gate signal GSIG1 is applied, a first electrode of the second transistor T2 may be connected to the second node N2, and a second electrode of the second transistor T2 may be connected to the input terminal for the low level driving voltage VSSEL. The third transistor T3 may break a connection between the first node N1 and the second node N2 during the first period PE1 and may connect the first node N1 to the second node N2 during the second period PE2, on the basis of a second gate signal GSIG2 which differs from the first gate signal GSIG1. A gate electrode of the third transistor T3 may be connected to the second gate line GLy to which the second gate signal GSIG2 is applied, a first electrode of the third transistor T3 may be connected to the first node N1, and a second electrode of the third transistor T3 may be connected to the second node N2.

The third node controller NC3 may control a voltage of the third node N3 with a voltage of the second node N2. The third node controller NC3 may apply the reference voltage Vref having an on level to the third node N3 during the first period PEL on the basis of a voltage of the second node N2 which is the low level driving voltage VSSEL, and may apply the low level driving voltage VSSEL to the third node N3 during the second period PE2, on the basis of a voltage of the second node N2 which is an on pulse voltage Von. The third node controller NC3 may include the fourth transistor T4 and the fifth transistor T5. The fourth transistor T4 may be diode-connected and may apply the reference voltage Vref having an on level to the third node N3. A gate electrode and a first electrode of the fourth transistor T4 may be connected to the third node N3, and a second electrode of the fourth transistor T4 may be connected to the input terminal for the reference voltage Vref. The fifth transistor T5 may break a connection between the third node N3 and the input terminal for the low level driving voltage VSSEL during the first period PEL on the basis of a voltage of the second node N2 which is the low level driving voltage VSSEL, and may connect the third node N3 to the input terminal for the low level driving voltage VSSEL during the second period PE2, on the basis of a voltage of the second node N2 which is an on pulse voltage Von. A gate electrode of the fifth transistor T5 may be connected to the second node N2, a first electrode of the fifth transistor T5 may be connected to the third node N3, and a second electrode of the fifth transistor T5 may be connected to the input terminal for the low level driving voltage VSSEL.

The driving transistor T6 may be a constant current driving element which includes a gate electrode connected to the third node N3 and a first electrode to which the high level driving voltage VDDEL is applied, and which generates a constant current through on-duty driving during the first period PE1, and is off-duty-driven during the second period PE2 based on a voltage of the third node N3. A second electrode of the driving transistor T6 may be connected to the light emitting device EL.

The driving transistor T6, as in FIG. 5, may not operate in a saturation region SR in a characteristic curve CC of a transistor current Itr based on a drain-source voltage Vtr thereof and may operate in a linear region LR. The driving transistor T6 may generate a driving current Id having a certain level corresponding to a specific drain-source voltage Vds in the linear region LR. Because the specific drain-source voltage Vds of the linear region LR is less than a drain-source voltage of the saturation region SR, in a case where the driving transistor T6 operates in the linear region LR, the high level driving voltage VDDEL may be relatively lower, and power consumption may decrease by a reduction in the high level driving voltage VDDEL. Because the driving transistor T6 operates in the linear region LR, the driving current Id flowing in the driving transistor T6 may be a constant current which is independent of a level of a data voltage Vdata. Because the driving transistor T6 functions as a switch without functioning as an analog current generating element which controls a level of a drain current on the basis of a level of the data voltage Vdata, it may not be needed to compensate for a driving characteristic deviation (a threshold voltage deviation and/or an electron mobility deviation) of the driving transistor T6 between pixels PXL. Accordingly, in the present embodiment, because an additional circuit for sampling and compensating for a driving characteristic of the driving transistor T6 in or outside the pixel PXL may be unnecessary, a circuit configuration may be simplified.

The light emitting device EL may be implemented as a micro-LED which includes an anode electrode connected to the second electrode of the driving transistor T6, a cathode electrode to which the low level driving voltage VSSEL is applied, and an inorganic emission layer disposed between the anode electrode and the cathode electrode. The light emitting device EL may emit light in response to a constant current input from the driving transistor T6 during the first period PE1 and may not emit light during the second period PE2. In one frame, an emission duty of the light emitting device EL may be based on an on duty of the driving transistor T6.

The pixel PXL according to the first embodiment having such a configuration may operate in a driving waveform of FIG. 6. One frame for driving of the pixel PXL may include the first period PE1 and the second period PE2 succeeding the first period PE1.

The first gate signal GSIG1 may be a square wave which is shifted from the gate high voltage VGH to the gate low voltage VGL in the first period PE1. The second gate signal GSIG2 may be a ramp wave which varies in a diagonal form up to the gate high voltage VGH from the gate low voltage VGL in the first period PE1 and the second period PE2.

In the first period PE1, a voltage of the first node N1 may be the data voltage Vdata, a voltage of the second node N2 may be the low level driving voltage VSSEL, and a voltage of the third node N3 may be the reference voltage Vref. The reference voltage Vref may be an on-level voltage for turning on the driving transistor T6.

In the second period PE2, when a voltage level of the second gate signal GSIG2 is higher than the data voltage Vdata, a gate-source voltage Vgs of the third transistor T3 may be higher than a threshold voltage of the third transistor T3, and thus, the third transistor T3 may be turned on. A voltage of the second node N2 may be the on pulse voltage Von based on the turn-on of the third transistor T3. The on pulse voltage may be between the data voltage Vdata and the low level driving voltage VSSEL and may be an on-level voltage for turning on the fifth transistor T5. In the second period PE2, the fifth transistor T5 may be turned on by the on pulse voltage Von of the second node N2, and thus, a voltage of the third node N3 may be the low level driving voltage VSSEL.

An on duty and an off duty of the driving transistor T6 may be determined based on a voltage of the third node N3. The driving transistor T6 may be turned on by the reference voltage Vref during the first period PE1, and the driving transistor T6 may be turned off by the low level driving voltage VSSEL during the second period PE2. The on duty of the driving transistor T6 may correspond to a length of the first period PE1 in one frame, and the off duty of the driving transistor T6 may correspond to a length of the second period PE2 in one frame.

The second gate signal GSIG2 may be less than the data voltage Vdata in the first period PE1 and may be greater than the data voltage Vdata in the second period PE2. Because the second period PE2 starts from a time at which a voltage level of the second gate signal GSIG2 is greater than the data voltage Vdata, as the data voltage Vdata increases, a length of the second period PE2 may be shortened and a length of the first period PE1 may increase in one frame. In other words, a length of the first period PE1 (i.e., an emission duty) where the light emitting device EL emits light in one frame may increase in proportion to a level of the data voltage Vdata.

For example, as in FIG. 7, an emission duty of when the data voltage Vdata is "Vdata1" which is relatively high may be greater than an emission duty of when the data voltage Vdata is "Vdata2" which is relatively low. Furthermore, in FIG. 7, a first on pulse voltage Von1 which is a voltage of the second node N2 when the data voltage Vdata is "Vdata1" may be greater than a second on pulse voltage Von2 which is a voltage of the second node N2 when the data voltage Vdata is "Vdata2". Also, a length of the second period PE2 where a voltage of the second node N2 is maintained as the first on pulse voltage Von1 may be shorter than a length of the second period PE2 where a voltage of the second node N2 is maintained as the second on pulse voltage Von2.

Second Embodiment

Figure 8:
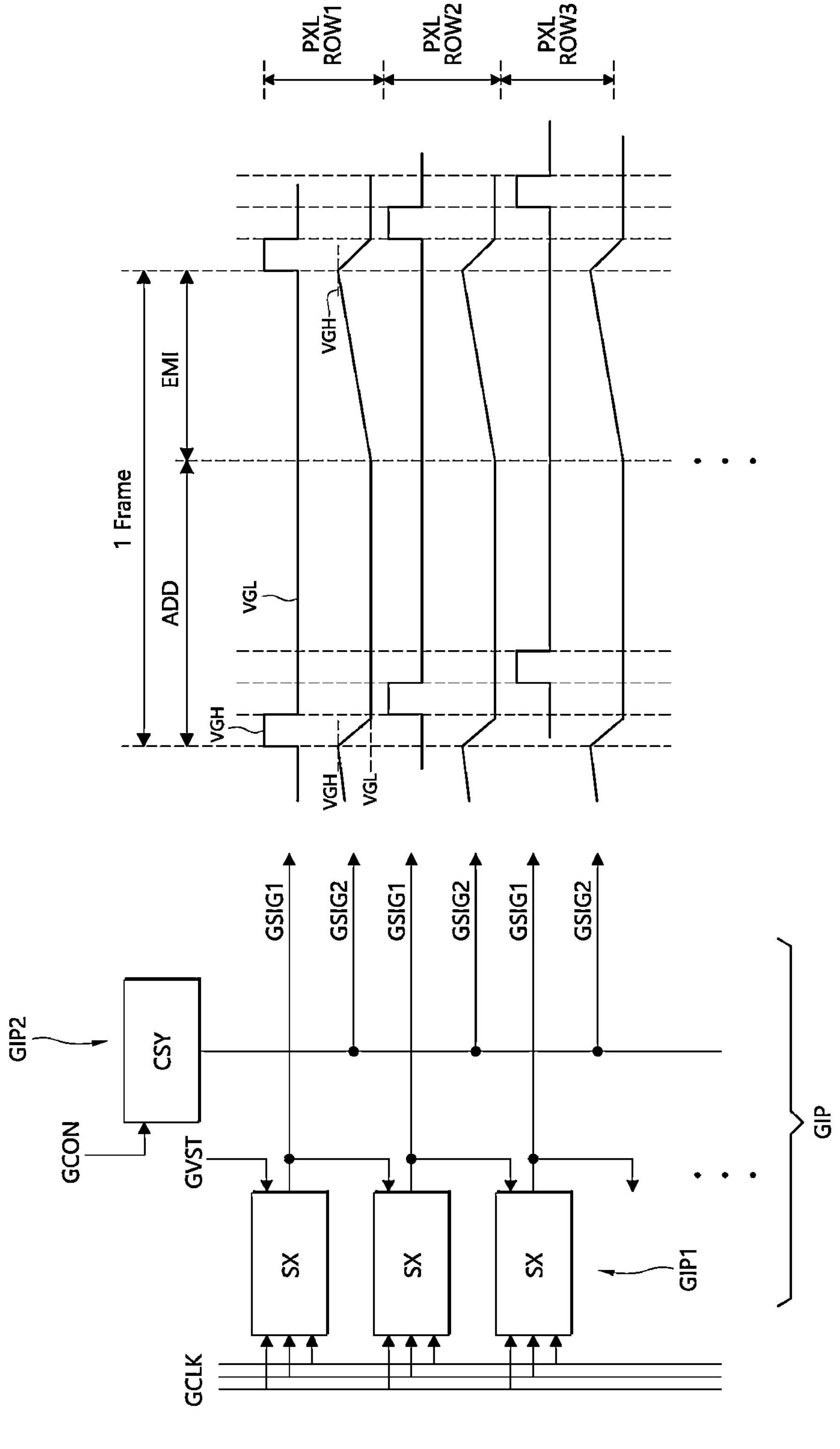
FIG. 8 is a diagram illustrating configurations of first and second gate drivers and gate signals generated by the gate drivers according to a second embodiment.
Figure 9:
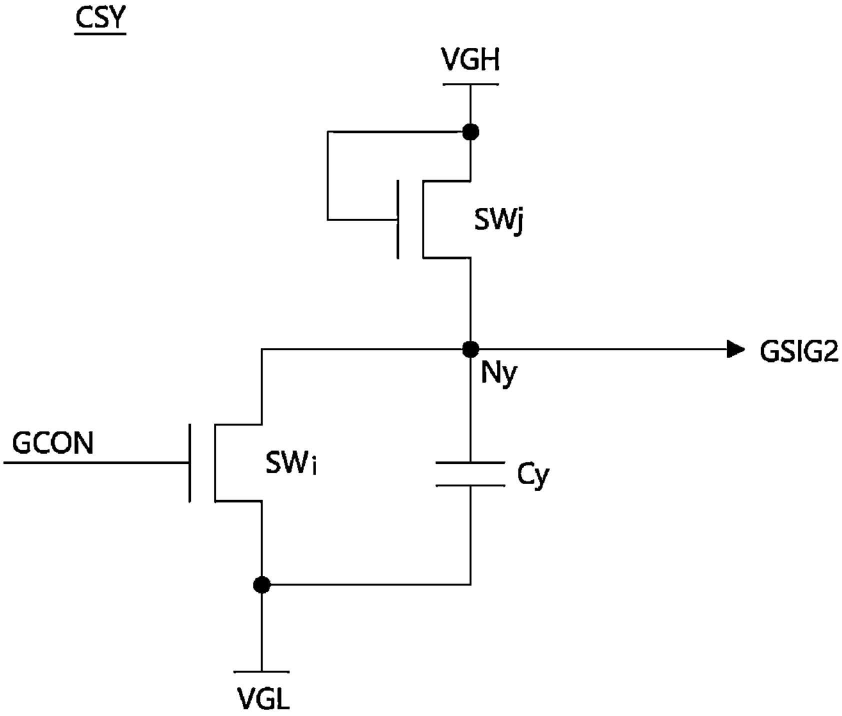
FIG. 9 is a diagram illustrating a configuration of a common gate stage of the second gate driver illustrated in FIG. 8 according to the second embodiment.
Figure 10:
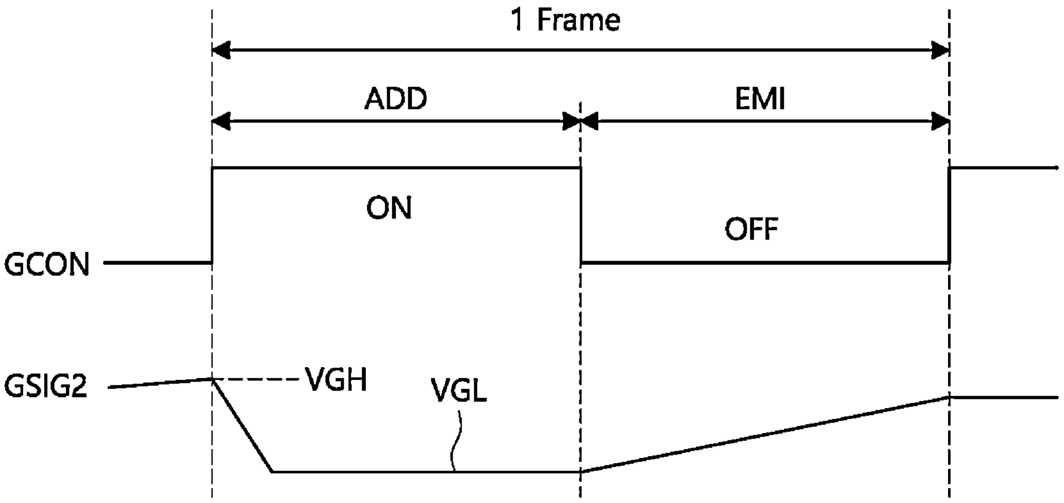
FIG. 10 is a diagram illustrating a driving waveform of the common gate stage illustrated in FIG. 9 according to the second embodiment.

FIG. 8 is a diagram illustrating configurations of first and second gate drivers and gate signals generated by the gate drivers according to a second embodiment. FIG. 9 is a diagram illustrating a configuration of a common gate stage of the second gate driver illustrated in FIG. 8 according to the second embodiment. FIG. 10 is a diagram illustrating a driving waveform of the common gate stage illustrated in FIG. 9 according to the second embodiment.

Referring to FIG. 8, a gate driver GIP according to the second embodiment may include a first gate driver GIP1 which drives a first gate line included in each pixel row and a second gate driver GIP2 which drives a second gate line included in each pixel row.

The first gate driver GIP1 may include a plurality of first gate stages SX which output a first gate signal GSIG1 having a phase sequentially shifted based on a gate start signal GVST and a gate clock GCLK. The first gate stages SX may be independently connected to the first gate lines of the pixel rows and may output the first gate signal GSIG1, having the sequentially shifted phase, to the first gate lines. The first gate signal GSIG1 may be a square wave which swings between a gate high voltage VGH and a gate low voltage VGL in one frame.

The second gate driver GIP2 may include one second gate stage CSY which outputs a second gate signal GSIG2 having a phase sequentially shifted based on a switch control signal GCON. The second gate stage CSY may be connected to the second gate lines of the pixel rows in common and may output the second gate signal GSIG2, having the same phase, to the second gate lines. The second gate signal GSIG2 may be a ramp wave which has the gate low voltage VGL in an address allocation period ADD of one frame and varies in a diagonal form up to the gate high voltage VGH from the gate low voltage VGL in an emission allocation period EMI succeeding the address allocation period ADD. Here, the address allocation period ADD may be defined as a period where the first gate lines of the pixel rows are sequentially scanned, and simultaneously, the second gate lines of the pixel rows are scanned. Also, the emission allocation period EMI may be defined as a maximum period where pixels may each emit light. In all pixel rows, the emission allocation period EMI and the address allocation period ADD may be separated from each other without overlapping.

When the second gate stage CSY is configured as a common gate stage, a circuit configuration of the second gate driver GIP2 may be simplified, and thus, a bezel size of a display panel may be easily reduced.

The second gate stage CSY, as illustrated in FIGS. 9 and 10, may include a first switch SWi which turns on or off an electrical connection between an output node Ny and an input terminal for the gate low voltage VGL on the basis of the switch control signal GCON, a second switch SWj which is diode-connected and applies the gate high voltage VGH to the output node Ny, and a storage capacitor Cy which is connected between the output node Ny and the input terminal for the gate low voltage VGL.

The switch control signal GCON may have an on level in the address allocation period ADD and may have an off level in the emission allocation period EMI. In the address allocation period ADD, a voltage of the storage capacitor Cy (e.g., a voltage of the output node Ny) may decrease in a diagonal form up to the gate low voltage VGL from the gate high voltage VGH on the basis of the switch control signal GCON having an on level, and then, may maintain the gate low voltage VGL during a certain period where the switch control signal GCON maintains an on level.

On the other hand, in the emission allocation period EMI, a voltage of the storage capacitor Cy (e.g., a voltage of the output node Ny) may increase in a diagonal form up to the gate high voltage VGH from the gate low voltage VGL on the basis of the switch control signal GCON having an off level.

As a result, the second gate signal GSIG2 output through the output node Ny may decrease in a diagonal form up to the gate low voltage VGL from the gate high voltage VGH in one frame, and then, may maintain the gate low voltage VGL during a certain period and may increase in a diagonal form up to the gate high voltage VGH from the gate low voltage VGL.

Figure 11:
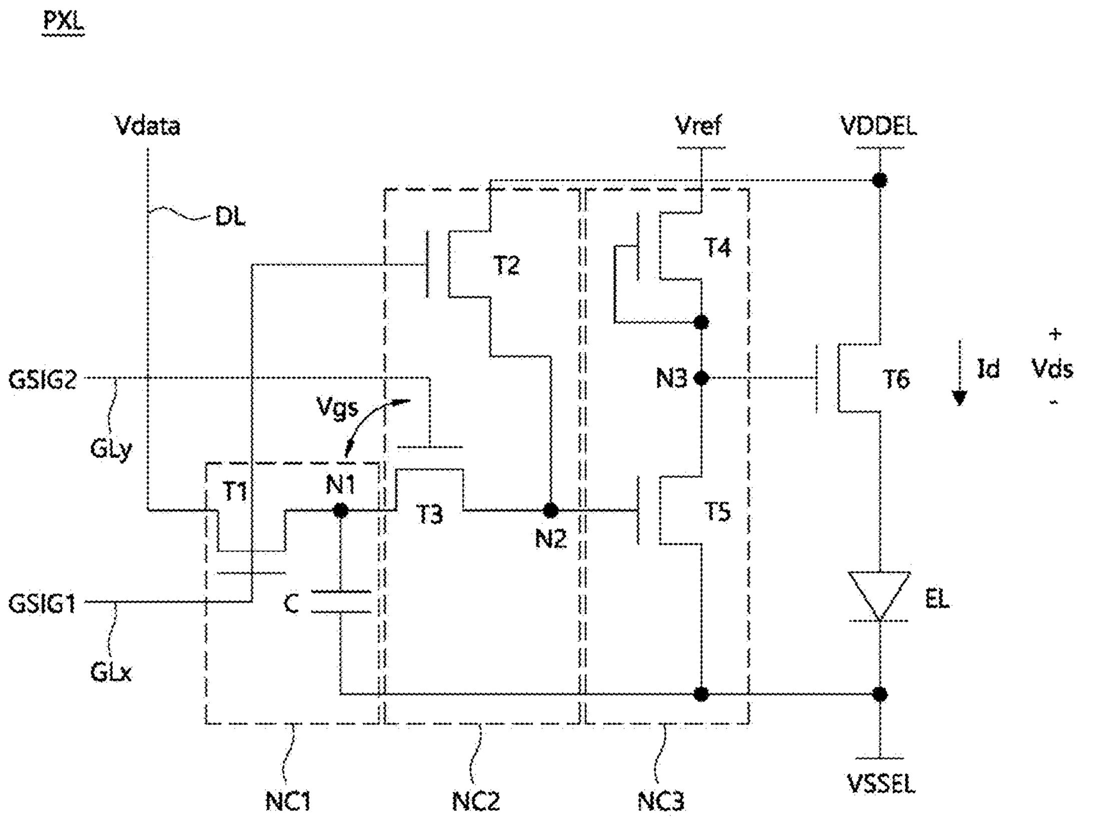
FIG. 11 is a diagram illustrating a configuration of a pixel according to the second embodiment.
Figure 12:
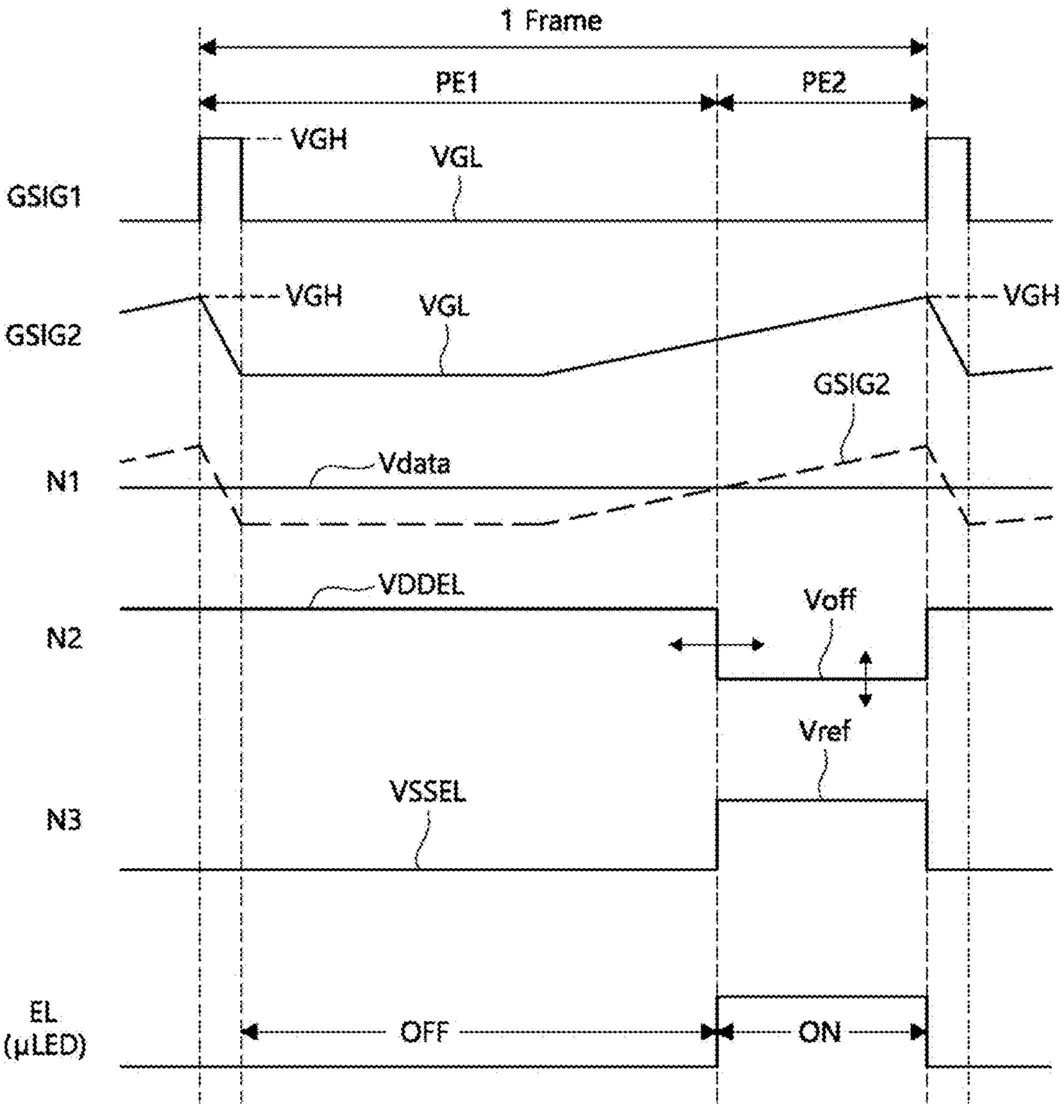
FIGS. 12 and 13 are diagrams illustrating a driving waveform of the pixel of FIG. 11 according to the second embodiment.
Figure 13:
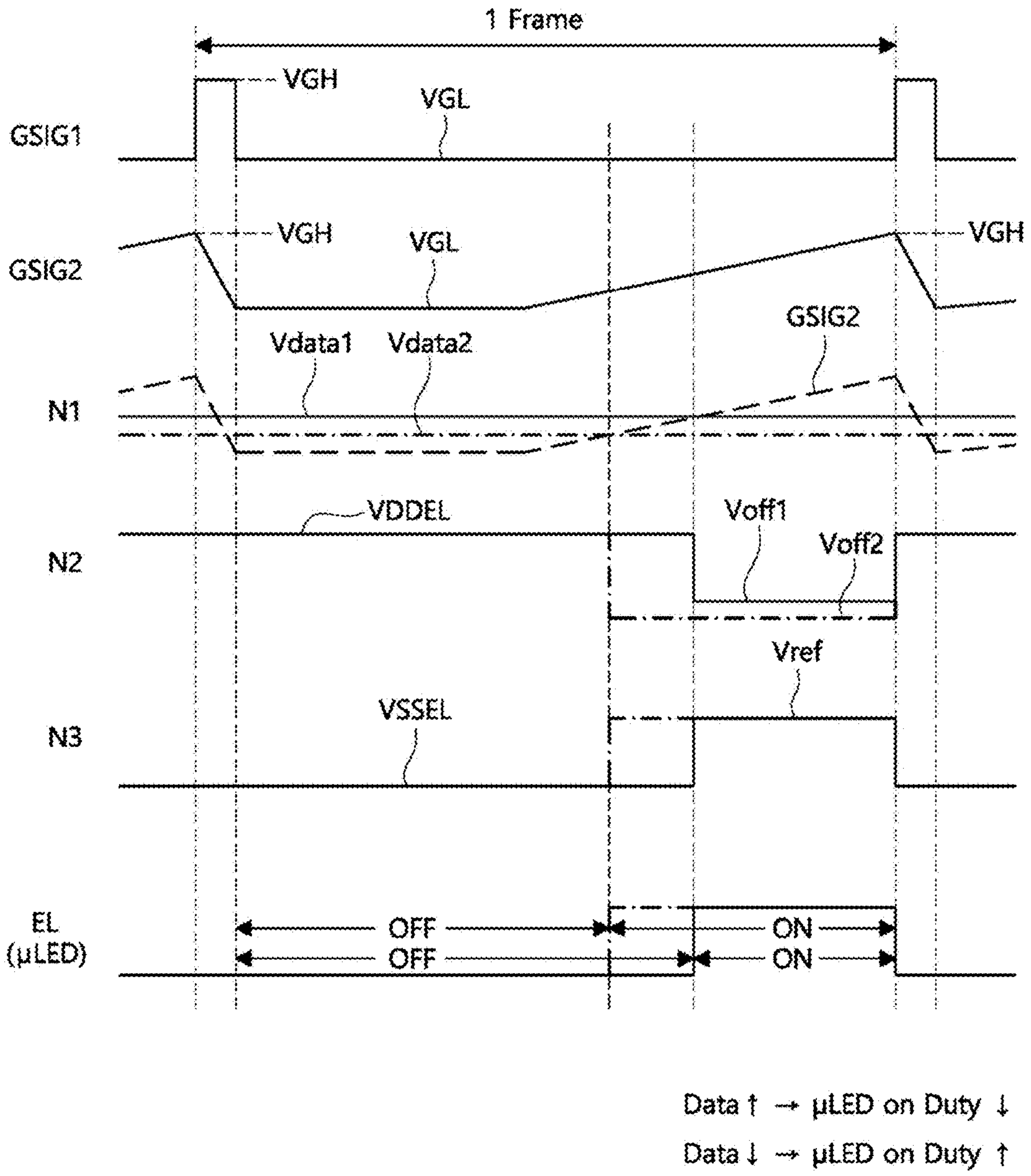

FIG. 11 is a diagram illustrating a configuration of a pixel according to the second embodiment. FIGS. 12 and 13 are diagrams illustrating a driving waveform of the pixel of FIG. 11 according to the second embodiment.

Referring to FIGS. 11 to 13, a pixel PXL according to the second embodiment of the present disclosure may include a pixel circuit including a light emitting device EL, first to sixth transistors T1 to T6, and a capacitor C. The first to sixth transistors T1 to T6 may each be implemented as an N-type MOSFET. The sixth transistor T6 may be a driving transistor.

The pixel circuit may include the light emitting device EL, a driving transistor T6, a first node controller NC1, a second node controller NC2, and a third node controller NC3.

The first node controller NC1 may apply a data voltage Vdata, which is for image expression, to the first node N1. The first node controller NC1 may include the first transistor T1 and the capacitor C. The first transistor T1 may apply the data voltage Vdata to the first node N1 during a first period PE1 in one frame, on the basis of the first gate signal GSIG1. A gate electrode of the first transistor T1 may be connected to a first gate line GLx to which the first gate signal GSIG1 is applied, a first electrode of the first transistor T1 may be connected to a data line DL, and a second electrode of the first transistor T1 may be connected to the first node N1. The capacitor C may be connected between the first node N1 and an input terminal for a low level driving voltage VSSEL.

The second node controller NC2 may shift a voltage of the second node N2, which is adjacent to the first node N1, from a high level driving voltage VDDEL to an off pulse voltage Voff corresponding to a difference between the data voltage Vdata and the high level driving voltage VDDEL. The second node controller NC2 may control a voltage of the second node N2 to the high level driving voltage VDDEL during the first period PE1 in the one frame and may control a voltage of the second node N2 to the off pulse voltage Voff during a second period PE2 succeeding the first period PE1 in the one frame. The second node controller NC2 may include the second transistor T2 and the third transistor T3. The second transistor T2 may apply the high level driving voltage VDDEL to the second node N2 during the first period PE1, on the basis of the first gate signal GSIG1. A gate electrode of the second transistor T2 may be connected to the first gate line GLx to which the first gate signal GSIG1 is applied, a first electrode of the second transistor T2 may be connected to the second node N2, and a second electrode of the second transistor T2 may be connected to the input terminal for the high level driving voltage VDDEL. The third transistor T3 may break a connection between the first node N1 and the second node N2 during the first period PE1 and may connect the first node N1 to the second node N2 during the second period PE2, on the basis of a second gate signal GSIG2 which differs from the first gate signal GSIG1. A gate electrode of the third transistor T3 may be connected to the second gate line GLy to which the second gate signal GSIG2 is applied, a first electrode of the third transistor T3 may be connected to the first node N1, and a second electrode of the third transistor T3 may be connected to the second node N2.

The third node controller NC3 may control a voltage of the third node N3 with a voltage of the second node N2. The third node controller NC3 may apply the low level driving voltage VSSEL to the third node N3 during the first period PE1, on the basis of a voltage of the second node N2 which is the high level driving voltage VDDEL, and may apply the reference voltage Vref having an on level to the third node N3 during the second period PE2, on the basis of a voltage of the second node N2 which is the off pulse voltage Voff. The third node controller NC3 may include the fourth transistor T4 and the fifth transistor T5. The fourth transistor T4 may be diode-connected and may apply the reference voltage Vref having an on level to the third node N3. A gate electrode and a first electrode of the fourth transistor T4 may be connected to the third node N3, and a second electrode of the fourth transistor T4 may be connected to an input terminal for the reference voltage Vref. The fifth transistor T5 may connect the third node N3 to the input terminal for the low level driving voltage VSSEL during the first period PEL on the basis of a voltage of the second node N2 which is the high level driving voltage VDDEL, and may break a connection between the third node N3 and the input terminal for the low level driving voltage VSSEL during the second period PE2, on the basis of a voltage of the second node N2 which is the off pulse voltage Voff. A gate electrode of the fifth transistor T5 may be connected to the second node N2, a first electrode of the fifth transistor T5 may be connected to the third node N3, and a second electrode of the fifth transistor T5 may be connected to the input terminal for the low level driving voltage VSSEL.

The driving transistor T6 may be a constant current driving element which includes a gate electrode connected to the third node N3 and a first electrode to which the high level driving voltage VDDEL is applied, and which is off-duty driving during the first period PE1, and generates a constant current through on-duty-driven during the second period PE2 based on a voltage of the third node N3. A second electrode of the driving transistor T6 may be connected to the light emitting device EL.

The driving transistor T6, as in FIG. 11, may not operate in a saturation region SR in a characteristic curve of a transistor current Itr based on a drain-source voltage Vtr thereof and may operate in a linear region LR. The driving transistor T6 may generate a driving current Id having a certain level corresponding to a specific drain-source voltage Vds in the linear region LR. Because the specific drain-source voltage Vds of the linear region LR is less than a drain-source voltage of the saturation region SR, in a case where the driving transistor T6 operates in the linear region LR, the high level driving voltage VDDEL may be relatively lower, and power consumption may decrease by a reduction in the high level driving voltage VDDEL. Because the driving transistor T6 operates in the linear region LR, the driving current Id flowing in the driving transistor T6 may be a constant current which is irrelevant to a level of a data voltage Vdata. Because the driving transistor T6 functions as a switch without functioning as an analog current generating element which controls a level of a drain current on the basis of a level of the data voltage Vdata, it may not be needed to compensate for a driving characteristic deviation (a threshold voltage deviation and/or an electron mobility deviation) of the driving transistor T6 between pixels PXL. Accordingly, in the present embodiment, because an additional circuit for sampling and compensating for a driving characteristic of the driving transistor T6 in or outside the pixel PXL may be unnecessary, a circuit configuration may be simplified.

The light emitting device EL may be implemented as a micro-LED which includes an anode electrode connected to the second electrode of the driving transistor T6, a cathode electrode to which the low level driving voltage VSSEL is applied, and an inorganic emission layer disposed between the anode electrode and the cathode electrode. The light emitting device EL may not emit light during the first period PE1 and may emit light in response to a constant current input from the driving transistor T6 during the second period PE2. In one frame, an emission duty of the light emitting device EL may be based on an on duty of the driving transistor T6.

The pixel PXL according to the second embodiment having such a configuration may operate in a driving waveform of FIG. 12. One frame for driving of the pixel PXL may include the first period PE1 and the second period PE2 succeeding the first period PE1. The first period PE1 may include an address allocation period described above. The second period PE2 may include all of an emission allocation period described above on the basis of a level of the data voltage Vdata, or may include a portion thereof. When the second period PE2 includes only a portion of the emission allocation period, a length of the first period PE1 may increase in proportion thereto.

The first gate signal GSIG1 may be a square wave which is shifted from the gate high voltage VGH to the gate low voltage VGL in the first period PE1. The second gate signal GSIG2 may be a ramp wave which maintains the gate low voltage VGL by the address allocation period and then varies in a diagonal form up to the gate high voltage VGH from the gate low voltage VGL in the first period PE1 and the second period PE2.

In the first period PE1, a voltage of the first node N1 may be the data voltage Vdata, a voltage of the second node N2 may be the high level driving voltage VDDEL, and a voltage of the third node N3 may be the low level driving voltage VSSEL.

In the second period PE2, when a voltage level of the second gate signal GSIG2 is higher than the data voltage Vdata, a gate-source voltage Vgs of the third transistor T3 may be higher than a threshold voltage of the third transistor T3, and thus, the third transistor T3 may be turned on. A voltage of the second node N2 may be the off pulse voltage Voff based on the turn-on of the third transistor T3. The off pulse voltage Voff may be between the data voltage Vdata and the high level driving voltage VDDEL and may be an off-level voltage for turning off the fifth transistor T5. In the second period PE2, the fifth transistor T5 may be turned off by the off pulse voltage Voff of the second node N2, and thus, a voltage of the third node N3 may be the reference voltage Vref.

An on duty and an off duty of the driving transistor T6 may be determined based on a voltage of the third node N3. The driving transistor T6 may be turned off by the low level driving voltage VSSEL during the first period PE1, and the driving transistor T6 may be turned on by the reference voltage Vref during the second period PE2. The on duty of the driving transistor T6 may correspond to a length of the second period PE2 in one frame, and the off duty of the driving transistor T6 may correspond to a length of the first period PE1 in one frame.

The second gate signal GSIG2 may be less than the data voltage Vdata in the first period PE1 and may be greater than the data voltage Vdata in the second period PE2. Because the second period PE2 starts from a time at which a voltage level of the second gate signal GSIG2 is greater than the data voltage Vdata, as the data voltage Vdata increases, a length of the second period PE2 may be shortened and a length of the first period PE1 may increase in one frame. In other words, a length of the second period PE2 (i.e., an emission duty) where the light emitting device EL emits light in one frame may decrease in proportion to a level of the data voltage Vdata.

For example, as in FIG. 13, an emission duty of when the data voltage Vdata is "Vdata1" which is relatively high may be less than an emission duty of when the data voltage Vdata is "Vdata2" which is relatively low. Furthermore, in FIG. 13, a first off pulse voltage Voff1 which is a voltage of the second node N2 when the data voltage Vdata is "Vdata1" may be higher than a second off pulse voltage Voff2 which is a voltage of the second node N2 when the data voltage Vdata is "Vdata2". Also, a length of the second period PE2 where a voltage of the second node N2 is maintained as the first off pulse voltage Voff1 may be shorter than a length of the second period PE2 where a voltage of the second node N2 is maintained as the second off pulse voltage Voff2.

The present embodiment may realize the following effects.

In the present embodiment, a gate signal which increases in a diagonal form up to a gate high voltage from a gate low voltage may be applied to a pixel, and a time at which a data voltage matches a ramp waveform of the gate signal in the pixel may be controlled based on a level of the data voltage, thereby adjusting an on/off timing of a driving transistor. Also, a light emitting device may be PWM-driven (i.e., duty-driven) by adjusting the on/off timing of the driving transistor. In the present embodiment, a temporal length where the light emitting device is turned on in one frame may be controlled based on the data voltage by using the PWM scheme, and thus, a gray level may be expressed based on an on duty of the light emitting device, thereby considerably enhancing low grayscale expression.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a plurality of pixels, wherein each of the plurality of pixels comprises:

a first node controller configured to apply a data voltage corresponding to input video data to a first node based on a first gate signal;

a second node controller configured to shift a voltage of a second node, which is adjacent to the first node, from a low level driving voltage to an on pulse voltage corresponding to a difference between the data voltage and the low level driving voltage based on the first gate signal and a second gate signal;

a third node controller configured to apply a reference voltage having an on level to a third node during a first period in one frame based on a voltage of the second node which is the low level driving voltage, and apply the low level driving voltage to the third node during a second period succeeding the first period in the one frame based on a voltage of the second node which is the on pulse voltage;

a driving transistor configured to include a gate electrode connected to the third node and a first electrode to which a high level driving voltage is applied, wherein the driving transistor is on-duty-driven during the first period and off-duty-driven during the second period based on a voltage of the third node; and a light emitting device including an anode electrode connected to a second electrode of the driving transistor and a cathode electrode to which the low level driving voltage is applied, wherein the light emitting device emits light in response to a constant current applied from the driving transistor during the first period and does not emit light during the second period, wherein the second gate signal varies from a high level voltage to a low level voltage in a diagonal form during which the light emitting device emits the light in the first period and the second gate signal increases to the high level voltage in the diagonal form during the second period.

2. The display apparatus of claim 1, wherein a level of the data voltage varies within a predetermined voltage range based on a gray level of the input video data, and a length of the first period where the light emitting device emits light in the one frame increases in proportion to a level of the data voltage.

3. The display apparatus of claim 1, wherein the first node controller comprises:

a first transistor configured to apply the data voltage to the first node during the first period based on a first gate signal; and a capacitor connected between the first node and an input terminal for the low level driving voltage.

4. The display apparatus of claim 3, wherein the second node controller comprises:

a second transistor configured to apply the low level driving voltage to the second node during the first period based on the first gate signal; and a third transistor configured to break a connection between the first node and the second node during the first period and connect the first node to the second node during the second period based on the second gate signal which differs from the first gate signal.

5. The display apparatus of claim 4, wherein the first gate signal is a square wave which is shifted from a gate on voltage to a gate off voltage in the first period, and the second gate signal is a ramp wave which varies in the diagonal form up to the gate on voltage from the gate off voltage in the first period and the second period.

6. The display apparatus of claim 5, wherein the second gate signal is less than the data voltage in the first period and is greater than the data voltage in the second period.

7. The display apparatus of claim 4, wherein the third node controller comprises:

a fourth transistor that is diode-connected to apply the reference voltage to the third node; and a fifth transistor configured to break a connection between the third node and the input terminal for the low level driving voltage during the first period based on a voltage of the second node which is the low level driving voltage, and connect the third node to the input terminal for the low level driving voltage during the second period based on a voltage of the second node which is the on pulse voltage.

8. The display apparatus of claim 5, further comprising:

a first gate stage configured to output the first gate signal based on a gate start signal and a gate clock; and a second gate stage configured to generate the second gate signal on based on the first gate signal and outputting the second gate signal to an output node.

9. The display apparatus of claim 8, wherein the second gate stage comprises:

a first switch configured to turn on or off an electrical connection between the output node and an input terminal for a gate off voltage based on the first gate signal;

a second switch that is diode-connected to apply a gate on voltage to the output node; and a storage capacitor connected between the output node and the input terminal for the gate off voltage.

10. The display apparatus of claim 1, wherein the driving transistor operates in a linear region in a characteristic curve of a transistor current based on a drain-source voltage of the driving transistor, a driving current flowing in the driving transistor in an on duty period of the driving transistor is constant regardless of a level of the data voltage, and an emission duty of the light emitting device is based on an on duty of the driving transistor.

11. A display apparatus comprising:

a plurality of pixels, wherein each of the plurality of pixels comprises:

a first node controller applying a data voltage corresponding to input video data to a first node based on a first gate signal;

a second node controller configured to shift a voltage of a second node, which is adjacent to the first node, from a high level driving voltage to an off pulse voltage corresponding to a difference between the data voltage and the high level driving voltage based on the first gate signal and a second gate signal;

a third node controller configured to apply a low level driving voltage to a third node during a first period in one frame based on a voltage of the second node which is the high level driving voltage, and apply a reference voltage having an on level to the third node during a second period succeeding the first period in the one frame based on a voltage of the second node which is the off pulse voltage;

a driving transistor configured to include a gate electrode connected to the third node and a first electrode to which the high level driving voltage is applied, wherein the driving transistor is off-duty-driven during the first period and on-duty-driven during the second period based on a voltage of the third node; and a light emitting device including an anode electrode connected to a second electrode of the driving transistor and a cathode electrode to which the low level driving voltage is applied, wherein the light emitting device does not emit light in response to a constant current applied from the driving transistor during the first period and emits light during the second period, wherein the second gate signal varies in a diagonal form in the first period and the second period, and the second period during which the light emitting device emits the light starts at a time when the second gate signal has a same magnitude as the data voltage.

12. The display apparatus of claim 11, wherein a level of the data voltage varies within a predetermined voltage range based on a gray level of the input video data, and a length of the second period where the light emitting device emits light in the one frame decreases in proportion to a level of the data voltage.

13. The display apparatus of claim 11, wherein the first node controller comprises:

a first transistor configured to apply the data voltage to the first node during the first period based on the first gate signal; and a capacitor connected between the first node and an input terminal for the low level driving voltage.

14. The display apparatus of claim 13, wherein the second node controller comprises:

a second transistor configured to apply the high level driving voltage to the second node during the first period based on the first gate signal; and a third transistor configured to break a connection between the first node and the second node during the first period and connect the first node to the second node during the second period based on the second gate signal which differs from the first gate signal.

15. The display apparatus of claim 14, wherein the first gate signal is a square wave which is shifted from a gate on voltage to a gate off voltage in the first period, and the second gate signal is a ramp wave which maintains the gate off voltage during a certain period of the first period, and then, varies in the diagonal form up to the gate on voltage from the gate off voltage up to an end of the second period from after the certain period.

16. The display apparatus of claim 15, wherein the second gate signal is less than the data voltage in the first period and is greater than the data voltage in the second period.

17. The display apparatus of claim 14, wherein the third node controller comprises:

a fourth transistor that is diode-connected to apply the reference voltage to the third node; and a fifth transistor configured to connect the third node to an input terminal for the low level driving voltage during the first period based on a voltage of the second node which is the high level driving voltage and break a connection between the third node and the input terminal for the low level driving voltage during the second period based on a voltage of the second node which is the off pulse voltage.

18. The display apparatus of claim 15, further comprising:

a first gate stage configured to output the first gate signal based on a gate start signal and a gate clock; and a second gate stage configured to generate the second gate signal based on a switch control signal and outputting the second gate signal to an output node, wherein the switch control signal has an on level in an address allocation period including a certain period and has an off level in an emission allocation period including the second period after the certain period.

19. The display apparatus of claim 18, wherein the second gate stage comprises:

a first switch configured to turn on or off an electrical connection between the output node and an input terminal for a gate off voltage based on the switch control signal;

a second switch diode-connected to apply a gate on voltage to the output node; and a storage capacitor connected between the output node and the input terminal for the gate off voltage.

20. The display apparatus of claim 18, wherein a plurality of first gate stages configured to output first gate signals having different phases are individually connected to different pixel rows including the plurality of pixels, the second gate stage is connected to the different pixel rows in common, and the second gate signal is applied to pixels of the different pixel rows in common.

21. The display apparatus of claim 11, wherein the driving transistor operates in a linear region in a characteristic curve of a transistor current based on a drain-source voltage of the driving transistor, a driving current flowing in the driving transistor in an on duty period of the driving transistor is constant regardless of a level of the data voltage, and an emission duty of the light emitting device is based on an on duty of the driving transistor.

* * * * *